3,519,645
PROCESS FOR THE PREPARATION OF
PROPANE-SULTONE
François Contat, Ecully, and Ghislain Schwachhofer,
Miribel, France, assignors to Progil, Paris, France, a
corporation of France
Filed Jan. 15, 1968, Ser. No. 697,642
Claims priority, application France, Jan. 27, 1967,
48,231
Int. Cl. C07d 89/06
U.S. Cl. 260—327                        7 Claims

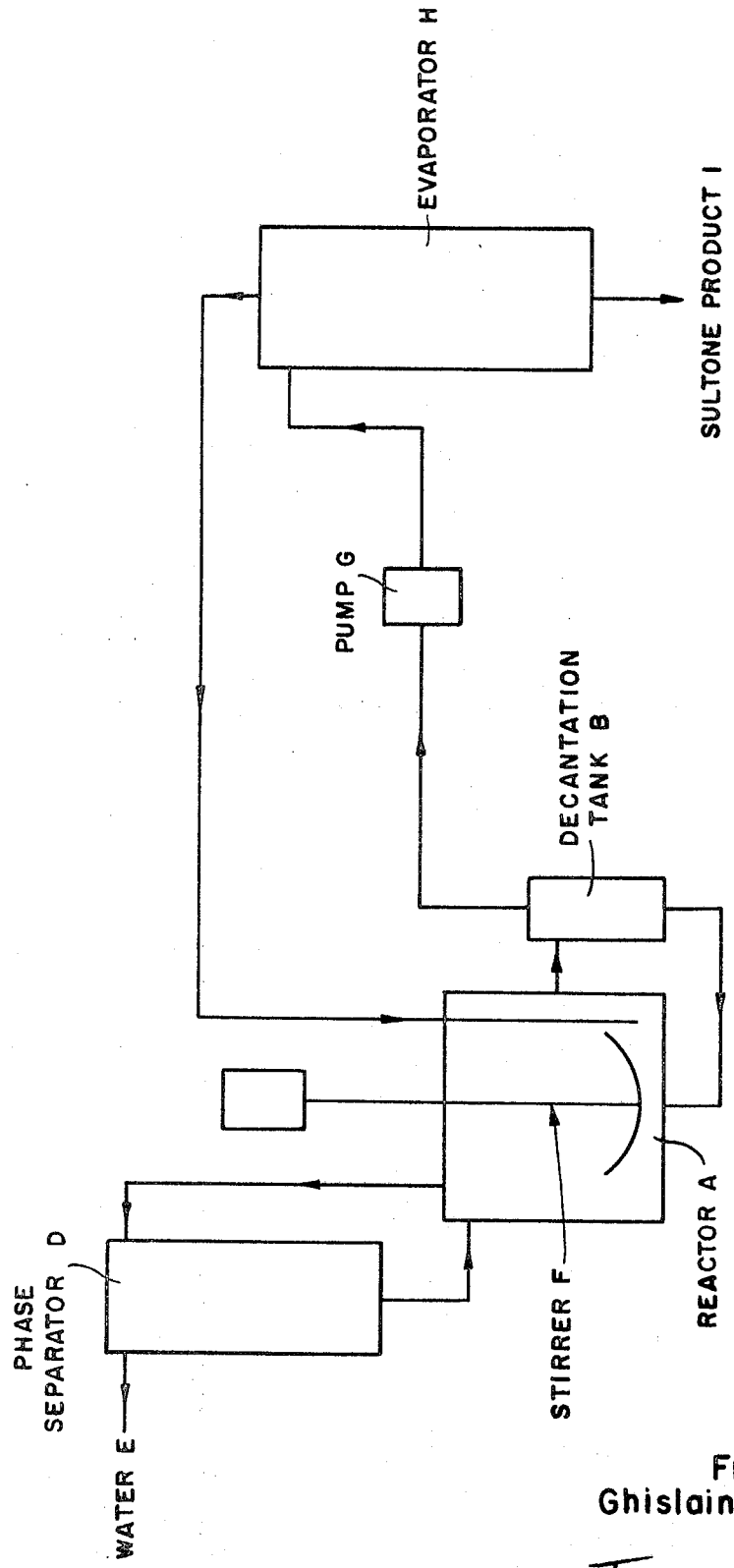

ABSTRACT OF THE DISCLOSURE

This invention relates to a process for the production of propane-sultone by dehydration of 3-hydroxy-propane-sulfonic acid in the presence of a dilution agent while continuously drawing off from the reaction mixture the solution of propane-sultone in the dilution agent from which the propane-sultone is recovered. The dilution agent may be an ether-oxide, ester, toluene, xylene or monochlorobenzene.

---

The present invention relates to a process for the preparation of propane-sultone by dehydration of the 3-hydroxy-propane-sulfonic acid, according to the reaction:

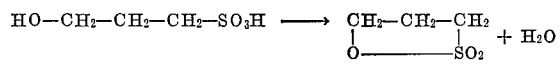

It is known that when hydroxy-propane-sulfonic acid is dehydrated by heating at a temperature of 110° to 150° C., to obtain the propane-sultone which distils off simultaneously, it is necessary to operate under a high vacuum, generally equal to 5 mm. Hg or lower, in order to prevent the decomposition of acid and sultone into sulfurous anhydride and the formation of heavy by-products. Accordingly, the yield of propane-sultone, which reaches 80% when operating under a pressure of 2 mm. Hg, falls to 70% under a pressure of 20 mm. and to 58% at a pressure under 30 mm. The application of such a vacuum constitutes a serious handicap for fabrication on an industrial scale.

A general method of preparation of alkane-sultones is also known, which has been developed in the laboratory. This method consists of dehydrating an hydroxy-alkane sulfonic acid by introducing it in the form of an alcoholic solution into boiling xylene. Dehydration water is removed by the formation of a ternary azeotrope, water/alcohol/xylene, while generally an additional quantity of xylene is added into the reaction mixture. Then the alkane-sultone obtained in this way, remaining in solution in the dehydration medium, is separated either by distillation under a reduced pressure or by precipitation (Willems, Bull. Soc. Chim. Belge 64 pp. 747–771 (1955)). The application of this general method to the manufacture of propane-sultone has never been described. Besides, the tests of the applicant have shown that such a process gives yields of about 50%. Moreover, this method has the disadvantage of distillation under reduced pressure.

Another known dehydration process of 3-hydroxy-propane sulfonic acid consists in boiling it for several hours in toluene and then recovering the propane-sultone by distillation. This process also results in a very poor yield. For example, boiling 40 gr. of hydroxy-propane sulfonic acid in toluene for 20 hours, and then distilling, yields 5 gr. of propane-sultone, which corresponds to a yield of about 15% with regard to acid (Furukawa—J. Chem. Soc., Japan 59, 1028–30, May 9, 1956).

A continuous process has now been developed which permits dehydration of the hydroxy-propane sulfonic acid and recovery of the formed propane-sultone, in excellent yields, without requiring operation under a high vacuum.

This process consists of bringing the hydroxy-propane-sulfonic acid to its dehydration temperature in the presence of a dilution agent capable of separating the water in the form of an azeotrope and of selectively dissolving the propane-sultone as it is formed, of continuously drawing off the solution of sultone from the reaction mixture and isolating sultone by solvent evaporation.

It has been established that the process, according to the present invention, besides the advantage to avoiding the application of a high vacuum, yields a great improvement in the yield and purity of the final product with respect to known techniques. Indeed, the continuous extraction of the sultone from the reaction mixture, quickens the dehydration of the hydroxy-propane-sulfonic acid. Moreover, the formed sultone does not remain exposed to the high temperature of dehydration, so that its decomposition and the by-products formation are reduced.

Inasmuch as hydroxy-propane sulfonic acid dehydrates, under the best conditions, in a range of temperatures between 110 and 150° C., and especially 120 to 135° C., the process of the present invention is conducted by bringing the reaction medium to a temperature between those limits. In practice, it is operated at the boiling temperature of the chosen dilution agent.

The inert compound or dilution agent which must be used in the hydroxy-propane-sulfonic acid dehydration and propane-sultone separation must comply with four requirements. It must be able to form an azeotrope with water, which separates into two phases. It must have, under the chosen pressure conditions, a boiling point situated in the range of the dehydration temperature. It must be a good selective solvent for propane-sultone at the temperature of the reaction. Finally, it must not dissolve the hydroxy-propane sulfonic acid and the heavy products possibly formed. Among the compounds answering those requirements are ether-oxides, esters and, preferably, aromatic hydrocarbons substituted by one or several halogen atoms on the ring, such as toluene, xylene, and monochlorobenzene.

The reaction takes place either under atmospheric pressure, or under a different pressure, greater than 50 mm. Hg, allowing, with the chosen solvent, the use of the precited range of boiling temperatures.

When putting the process according to the present invention into practice, it is noted that the reaction mixture has two different phases, the one consisting of the hydroxy-propane sulfonic acid and the other one comprising the dilution agent in which propane-sultone is dissolved as it is formed. When the system is at rest, the acid forms the lower phase while the propane sultone solution is the upper phase. So, in the practice of the process, it is possible, by providing a decantation tank connected to the reactor, to draw off easily in a continuous way the solution of propane-sultone.

The process according to the present invention may be conducted in any device of a known type having a reactor and a decantation tank, a system for condensing the azeotrope and possibly separating it into its constituents, and an apparatus permitting the separation of the propane-sultone from its solvent, preferably an evaporator. In this case, the solvent is recycled into the reactor as a vapor, thus bringing the calories necessary for the dehydration. The fraction of the dilution agent forming the azeotrope with water, may also be sent back to the reactor. It is also advantageous to provide a continuous feeding of hydroxy-propane sulfonic acid into the reactor.

The hydroxy-propane sulfonic acid being used as a raw material in the process according to the present invention, may be obtained according to the known processes. For example, the corresponding alkali metal salt is first formed, by addition of alkali metal bisulfite to acrolein, followed by a reduction, or by addition of bisulfite to allylic alcohol in the presence of oxygen or of an oxygen-liberating agent; then the free acid is prepared with the help of an inorganic acid such as hydrochloric acid or of an ion-exchange resin.

The examples hereinafter given in a non-limitative way, illustrate the improvements brought by the techniques according to the present invention.

EXAMPLE 1

The test illustrated in this example has been made in the apparatus represented on the accompanying figure.

This apparatus comprises a heat-insulated reactor A, provided with a stirrer F connected to a decantation tank B and to a phase separator D surmounted with a cooler (not represented on the drawing). The separator and the cooler are utilized to condense the azeotrope, water-dilution agent. Water is collected at E while the dilution agent falls again into the reactor A. The decantation tank B in which the two phases of the reaction mixture are separated, is connected by heat-insulated piping to evaporator H. The phase of propane-sultone solution is sent from B to evaporator H by means of the pump G; sultone is drawn off at 1. Heat-insulated piping returns the vapors of solvent from the evaporator back to the reactor A.

Into the reactor A, 2440 gr. of hydroxy-propane sulfonic acid (17.4 moles) and 3500 gr. of toluene are charged. The mixture is brought to the temperature of 110° C. under normal pressure. Then 5 l./h. of propane-sultone solution are drawn off from the tank B. The temperature is maintained in the reactor due to the calories brought by the toluene vaporized continuously in H and returned to the reactor. After 20 hours of operation, 1770 gr. of propane-sultone are obtained, which corresponds to a yield of 83.3% with regard to the hydroxy-propane sulfonic acid used.

The propane-sultone obtained in this way is pure enough for its subsequent use. It is possible to further purify it by distillation under a pressure of 30 to 100 mm. Hg.

This example illustrates the superiority of the process of the invention, as it allows a yield of 83.3% to be obtained while in the known method mentioned hereinabove and according to which the same dilution agent was used, that is toluene, a yield of about 15% was obtained.

EXAMPLE 2

When using the same process as in Example 1, 2580 gr. (18.4 moles) of hydroxy-propane sulfonic acid are dehydrated using 1500 g. of monochlorobenzene as the dilution agent. The temperature in the reactor is 135° C. and the reaction takes place under atmospheric pressure. The operation is conducted for 10 hours drawing off 2.5 l./h. of propane-sultone solution. 1880 g. of propane-sultone are obtained, which is a yield of 83.7%.

EXAMPLE 3

In the same process as in Example 1, a total of 9420 g. of raw hydroxy-propane sulfonic acid, corresponding to 55.4 moles of pure acid, are fed in three fractions into the reactor A containing 1500 g. of monochlorobenzene. The temperature of the mixture is brought to 135° C., and it is operated under atmospheric pressure. First the free water contained in the raw acid is removed, then the operation continues for 30 hours, drawing off 2.5 l./h. of propane-sultone solution. After simple distillation under 100 mm. Hg 5590 g. of pure sultone are obtained, which is a yield of 82.7%.

EXAMPLE 4

This example is intended to illustrate an operation taking place under a pressure slightly lower than atmospheric.

3230 g. of raw hydroxy-propane sulfonic acid corresponding to 18.9 moles of pure acid, and 1500 g. of monochlorobenzene are charged into the reactor A. The temperature is brought to 123° C. under a pressure of 660 mm. Hg. After removing the free water contained in the raw acid, the operation is contained for 12 hours drawing off 2.5 l./h. of the phase of sultone in solution. 2000 g. of propane-sultone are obtained, which corresponds to a yield of 86.7%.

It will be obvious to those skilled in the art that various changes may be made without departing from the scope of the invention and the invention is not to be considered limited to what is shown in the drawings and described in the specification.

What is claimed is:

1. Process of preparation of propane-sultone by heating of 3-hydroxy-propane-sulfonic acid to its dehydration temperature in the presence of a dilution agent capable of separating the dehydration water in the form of an azeotrope, of dissolving selectively the propane-sultone as it is formed and having a boiling point in the range of the dehydration temperature under the pressure conditions utilized comprising continuously drawing off the solution of sultone formed from the reaction mixture and isolating by solvent evaporation.

2. Process according to claim 1 wherein the dilution agent is selected from the group consisting of ether-oxides, esters and aromatic hydrocarbons, which may be substituted on the ring by halogen.

3. Process according to claim 1 wherein the dilution agent is toluene, xylene, or monochlorobenzene.

4. Process according to claim 1 wherein the dehydration reaction takes place at a temperature of 110 to 150° C.

5. Process according to claim 4 wherein the dehydration reaction takes place at a temperature of 120–135° C.

6. Process according to claim 1 wherein it is operated under a pressure greater than 50 mm. Hg.

7. Process according to claim 1 wherein the solution of sultone drawn off is evaporated to recover the sultone and the recovered dilution agent is returned to the reaction mixture.

References Cited

UNITED STATES PATENTS 3,115,501   12/1963   Finch et al. _____ 260—327

JAMES A. PATTEN, Primary Examiner